United States Patent [19]

Kanitani

[11] Patent Number: 5,254,923
[45] Date of Patent: Oct. 19, 1993

[54] INDUSTRIAL ROBOT SYNCHRONOUS CONTROL METHOD AND APPARATUS

[75] Inventor: Kiyoshi Kanitani, Toyama, Japan

[73] Assignee: Nachi-Fujikoshi Corp., Toyama, Japan

[21] Appl. No.: 916,717

[22] Filed: Jul. 22, 1992

[30] Foreign Application Priority Data

Jul. 24, 1991 [JP] Japan ................... 3-206214

[51] Int. Cl.$^5$ .................... B25J 9/16; G05B 19/18
[52] U.S. Cl. ................ 318/568.11; 901/1; 901/8; 318/568.15; 318/568.12
[58] Field of Search ........... 901/1, 8; 318/568.11, 318/568.15, 568.12

[56] References Cited

U.S. PATENT DOCUMENTS

| | | | |
|---|---|---|---|
| 4,841,210 | 6/1989 | Kato | 318/568.11 X |
| 4,853,874 | 8/1989 | Iwamoto et al. | 901/8 X |
| 5,084,826 | 1/1992 | Hariki et al. | 901/8 X |
| 5,086,262 | 2/1992 | Hariki et al. | |
| 5,105,367 | 4/1992 | Tsuchihashi et al. | 901/8 X |
| 5,157,315 | 10/1992 | Miyake et al. | 318/568.11 |

FOREIGN PATENT DOCUMENTS 60-144806  7/1985  Japan .
60-175112  9/1985  Japan .

Primary Examiner—William M. Shoop, Jr.
Assistant Examiner—Karen Masih
Attorney, Agent, or Firm—Spencer, Frank & Schneider

[57] ABSTRACT

In order to synchronize the operations of at least two industrial robots which can operate independently of each other in accordance with their respective operation programs, the time is obtained which is required for one of the robots serving as the master to move from one working position to the next position at which it operates jointly with the remaining robot. The remaining robot serving as the slave is moved from the position where it exists at present to another position corresponding to said next position, thereby synchronizing the operations of all the robots. An apparatus for such synchronous control comprises a program used to compute with a specified moving speed the interpolation movement due to which each robot is moved between the adjacent working positions and a program used to compute the interpolation movement with a specified moving time. In case of the asynchronous control, the robots move independently in accordance with their respective operation programs. On the other hand, in case of the synchronous control, the interpolation movement of the master robot is decided according to the moving speed specified program, while the interpolation movement of the slave robot is decided according to another program with the moving time of the master robot being specified.

10 Claims, 5 Drawing Sheets

INDUSTRIAL ROBOT SYNCHRONOUS CONTROL METHOD AND APPARATUS

BACKGROUND OF THE INVENTION

The present invention relates to control method and apparatus for operating more than two industrial robots synchronously.

Heretofore, line tracking control has been widely known as the method of operating the industrial robots synchronously. For example, Japanese Patent Unexamined Publication Nos. 60-144806 and 60-175112 disclose robot operating methods based on this control. However, although these methods are both available to make one robot synchronize with a work which is moved by making use of a conveyor, a turntable or the like, they cannot be employed to make a plurality of robots synchronize with each other.

The method of operating a plurality of robots synchronously is disclosed in U.S. Pat. No. 5,086,262, for example. The invention disclosed in this publication has been assigned to the same assignee as the invention of the present application, in which invention a common clock is provided so as to move the robots in accordance with this clock at all times to thereby make the plurality of robots synchronize with each other.

SUMMARY OF THE INVENTION

In order to operate a plurality of robots more efficiently, it is advisable that the robots can be operated selectively synchronously. More specifically, it is advisable that the robots can be moved synchronously according to only a part of the operation program and independently according to the other part thereof, and furthermore, these operations are compatible with the interpolation control by which the robots are moved on a straight line or a circle for the purpose of the movement between the working positions.

Here, it is considered that, in a suppositional system having for example two robots, one of the robots is used to take out a work, hold the work during the manufacturing process and pack the finished work in a box and the other robot is used to do the working with respect to the work held by the first robot as it grasps a trimming tool or a welding torch. In this system, the two robots need to operate synchronously with each other in case of the joint working. Further, in case that there are several working spots the positions of which are differed from each other, the robots have to operate synchronously while performing the linear or circular interpolation movement. On the other hand, in case that, after the completion of the working, only one of the robots is used to take out the work and pac it in the box while the other robot is used, during that time, to perform the maintenance work such as polishing and cleaning of the tool, the two robots need to operate independently or each other.

Since the aforementioned line tracking control is the method of synchronizing the robots with the work which is being moved, it is impossible to actualize the operation of the robots described above. According to the aforesaid method of synchronizing a plurality of robots as well, it is difficult to actualize the linear and circular interpolation movements, and further, it is impossible to make the robots synchronize with each other and operate independently by changing the operations thereof.

An object of the present invention is to provide a control method which is capable of operating a plurality of robots more efficiently.

Another object of the present invention is to provide a control method which is capable of making more than two robots synchronize with each other to do a joint working and move independently of each other while performing a linear or circular interpolation movement.

Still another object of the present invention is to provide a control apparatus which is capable of putting the above-described method into practice.

To this end, according to the present invention, when the synchronization is necessary, the time is obtained which is required for one of at least two industrial robots which can be operate independently of each other to move from one working position to the next working position, and the remaining robot is moved from the position corresponding to said one working position to another position corresponding to said next working position in the same time as said required time, thereby synchronizing the operations of all the robots.

BRIEF DESCRIPTION OF DRAWINGS

The above-mentioned and other objects, features as well as advantages of the present invention will be made clearer by the detailed description of the preferred embodiments of the invention referring to the attached drawings in which.

DESCRIPTION OF THE EMBODIMENTS

Figure 1:
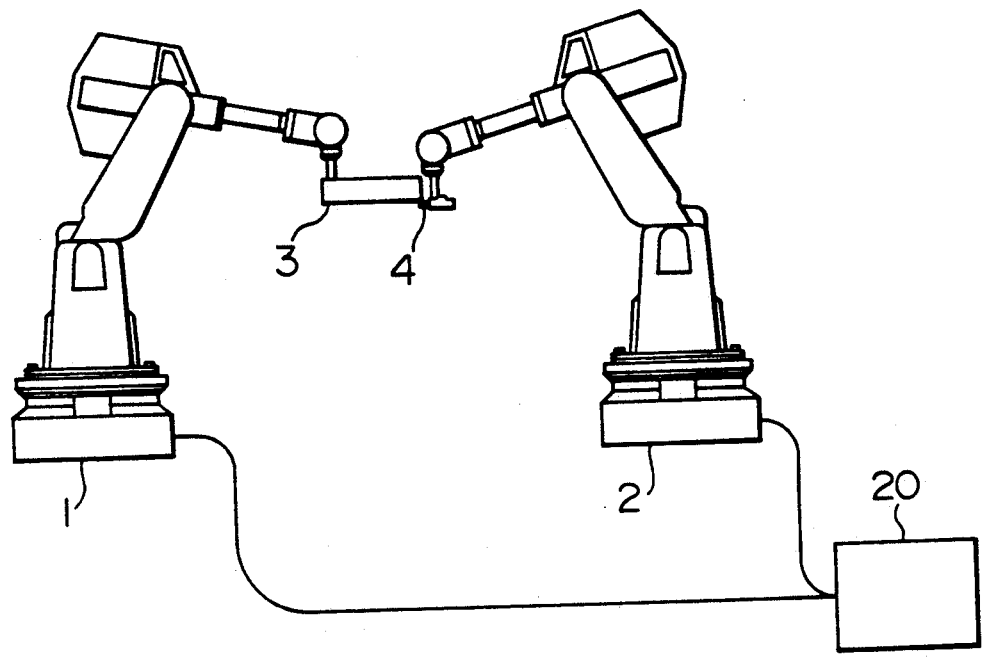
FIG. 1 is a sketch view of an example of industrial robot system to which a synchronous control method of the present invention is applied.

Description will be given below of industrial robot synchronous control method and apparatus of the present invention by referring to preferred embodiments shown in the drawings.

FIG. 1 illustrates an example of industrial robot system to which a synchronous control method of the present invention is applied. The system comprises two robots 1 and 2 and a control unit 20 for these robots, which control system is an embodiment according to another aspect of the present invention. In this system, the robot 1 serves to hold a work 3 and the robot 2 serves to grasp a trimming tool, that is, a grinder 4. In FIG. 1, the control unit 20 is shown as being provided separately from the robots 1 and 2, and however, it can be built in each or either of the robots 1 and 2 as well.

Figure 2:
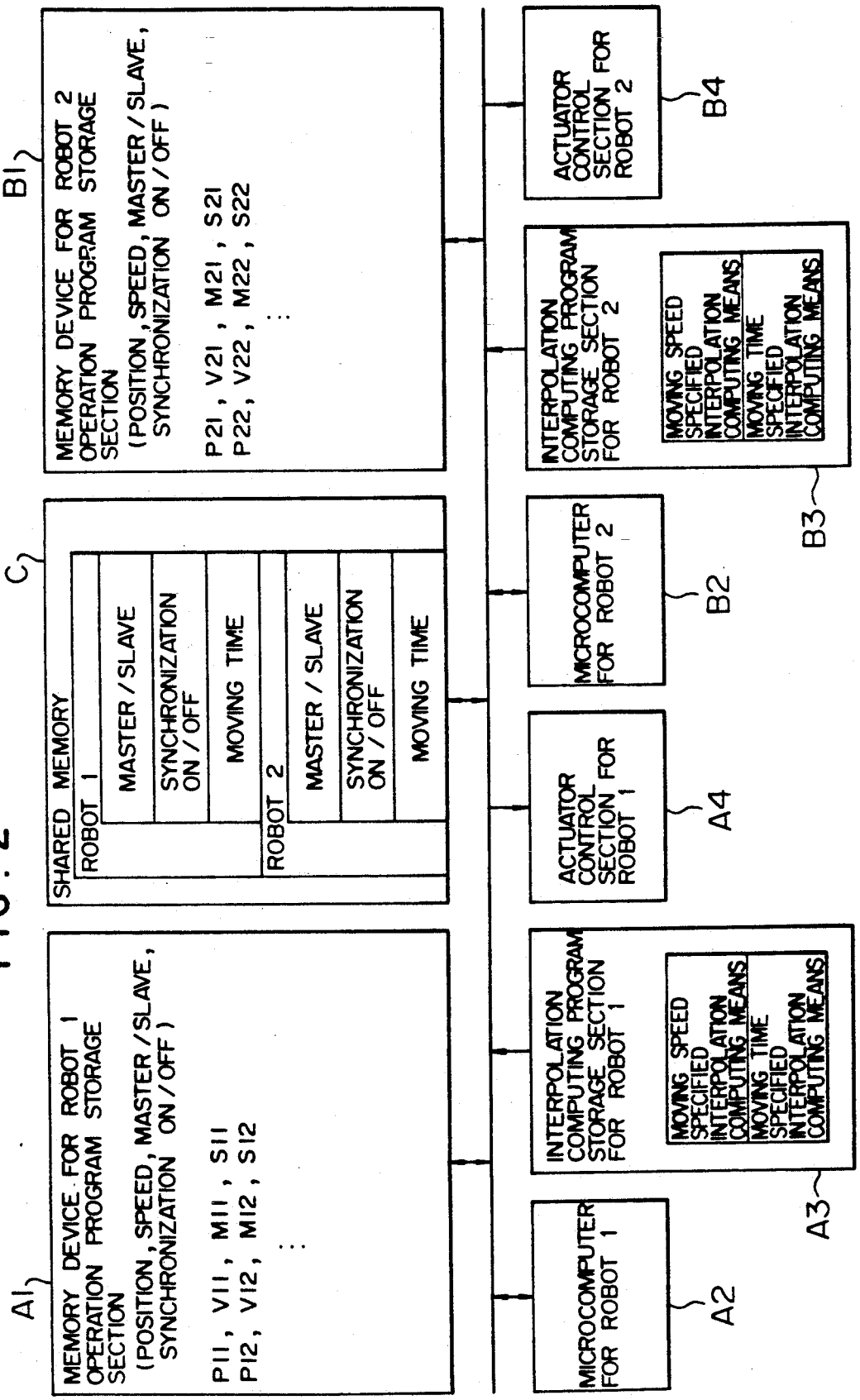
FIG. 2 is a block diagram showing the construction of a control apparatus according to an embodiment of the present invention.

The control unit 20 comprises, as shown in FIG. 2, a memory device A1, a microcomputer A2, an interpolation computing program storage section A3 and an actuator control section A4 which are intended for the robot 1, and a memory device B1, a microcomputer B2, an interpolation computing program storage section B3 and an actuator control section B4 which are intended for the robot 2, as well as a shaped memory C. The memory devices A1 and B1 each have an operation program storage section in which the operation program of the robots 1 or 2 is stored. In each of the interpolation computing program storage sections A3 and B3, the interpolation computing program is stored as well as a moving speed specified interpolation computing means and a moving time specified interpolation computing means are provided. These elements are so connected as to be able to interchange signals and informations with each other.

The function of this control unit will be described briefly in conjunction with the sections A1 to A4 for the robot 1. As a command is issued to operate the robot 1, the microcomputer A2 is operated to read the operation program from the storage section of the memory device A1 as well as to compute the operation locus of the robot 1 in accordance with the interpolation computing program stored in the storage section A3. The operation locus thus computed is instructed to the actuator control section A4 as the data group of the positions of the axis actuators of the robot 1 so a to operate the robot 1. The elements B1 to B4 for the robot 2 are operated to execute the same control on the robot 2 as well. In this way, the two robots can be controlled independently.

The operation programs stored in the storage section A1 or B1 contain the informations used to synchronize a plurality of robots in addition to the working positions and the speeds at which the robots are moved to these positions. These informations include a synchronization ON/OFF information used to decide whether or not it is necessary to synchronize the robots and a master/slave information used to decide which robot is recognized as the master when it is necessary to synchronize the robots. The master/slave decision information may be stored in the other storage section for parameter in place of the operation program storage section when it is not required to be changed at every stage of work.

In FIG. 2, the position to which the robot 1 has to be moved is represented by P11-12. This position information actually includes, in case of for example a 6-axis robot the angle P11 of each axis ($\theta 111$-$116$), the tip co-ordinates (X, Y, Z) and the wrist attitude ($\theta x$, $\theta y$, $\theta z$). This is equal as to the position P21-22 of the robot 2. Further, the moving speed, the master/slave information and the synchronization information are represented by V11-12, M11-12 and S11-12, respectively.

Each of the interpolation computing program storage sections A3 and B3 comprises, in addition to the ordinary means for computing the linear or circular interpolation in accordance with the moving speed, the means for computing the same in accordance with the moving time instead of the moving speed, as mentioned above. The shared memory C in which the informations from the control sections for the robots 1 and 2 can be read and written has areas for storage of the master/slave information and the synchronization information of each robot as well as the moving time of the master robot.

Figure 3:
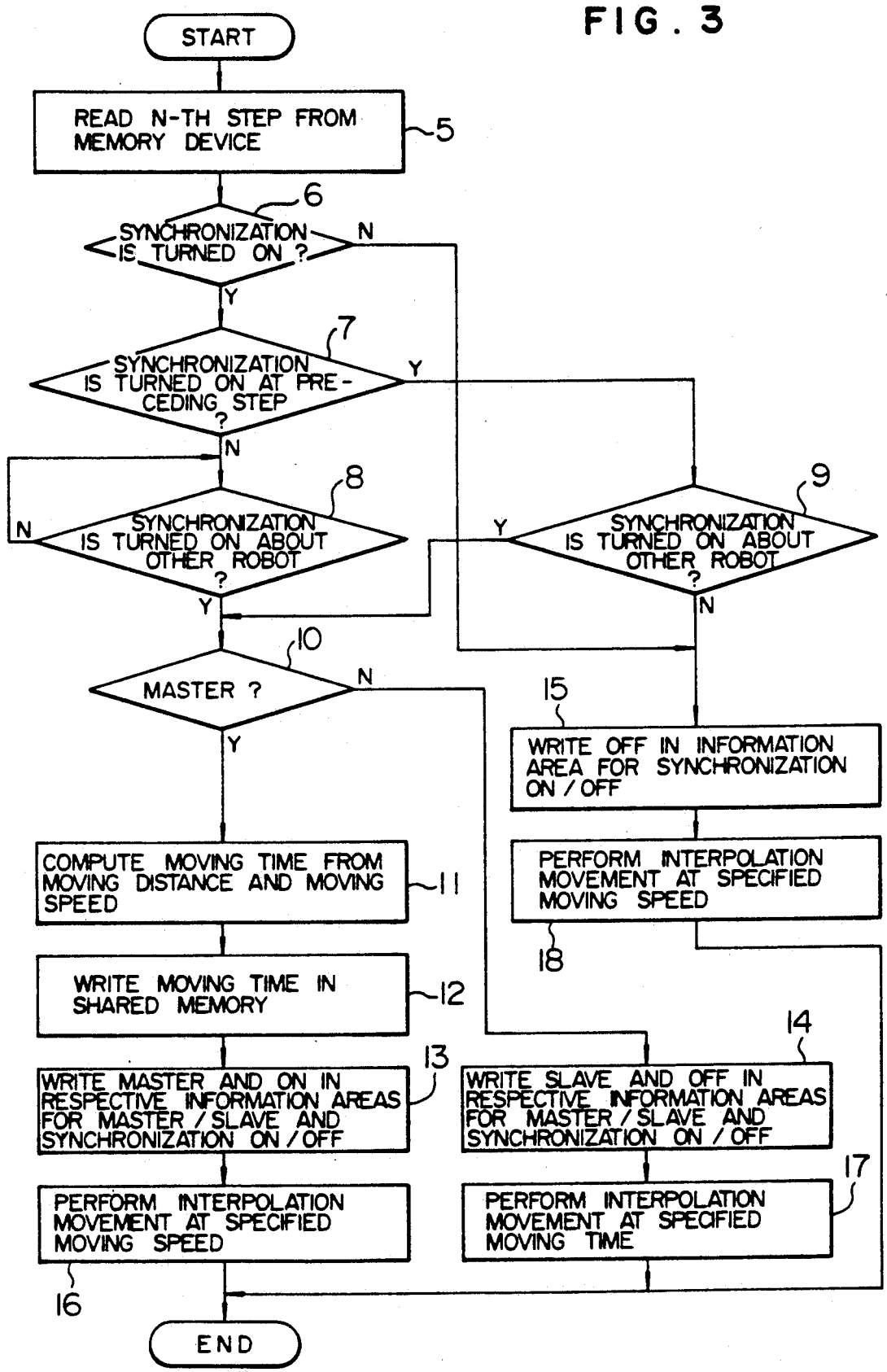
FIG. 3 is a flow chart of the synchronous control effected by the apparatus of FIG. 2.

Next, the synchronous control by the control unit 20 will be described by referring to the flow chart of FIG. 3. The illustrated control flow is common to the master robot and the slave robot. In this case, for the convenience of the explanation, the robot 2 is designated as the master and the robot 1 as the slave. Either robot fetches the operation program from the memory device A1 or B1 step by step so as to execute the operation in accordance with this program. It is noted that "step" used here means a set of informations including P11, V11, M11 and S11 and corresponds to one working position.

As the system is started, the microcomputer fetches or reads out a set of informations from the memory in the first place at block 5. Subsequently, at block 6, it is judged from the read information whether or not it is necessary to synchronize the robots. When it is judged that the synchronization is turned OFF, the processing proceeds to blocks 15 and 18 so that the robots are controlled asynchronously or independently.

On the other hand, when the synchronization is turned ON, the processing proceeds to block 7. At block 7, it is judged whether or not the synchronization has been changed from OFF to ON. If it is judged as being changed, the processing proceeds to block 8 at which it is rendered standby until the other robot arrives at the step where the synchronization is turned ON. As the other robot arrives at the step where the synchronization is turned ON, the processing proceeds to block 10 at which it is judged from the read information that the robot to be controlled is the master or the slave.

In case of the robot 2, since this robot is the master as mentioned before, the processing is executed at blocks 11 to 16. Namely, at block 11, the time required for the movement of the master robot is obtained from the moving distance and moving speed of the master robot. At block 12, the obtained moving time is written in the corresponding area for the robot 2 in the shared memory C. Likewise, at block 13, the information that the robot is the master and the information that the synchronization is turned ON ar written in the master/slave information area and the synchronization information area of the shared memory, respectively. Thereafter, the processing proceeds to block 16 at which the robot 2 is made to perform the interpolation movement. In other words, the necessary interpolation movment is computed by the moving speed specified interpolation computing means of the storage section B3 based on the specified moving speed. According to the result of this computing, the control unit 20 operates to move the robot 2 through the actuator control section B4.

In case of the robot 1, since this robot is the slave, the processing is executed at blocks 14 and 17. Namely, at block 14, the information that the robot is the slave and the information that the synchronization is turned ON are written in the master/slave information area and the synchronization information area for the robot 1 of the shared memory C, respectively. Subsequently, at block 17, the robot 1 is made to perform the interpolation movement through the actuator control section A4. In this case, the interpolation movement of the robot 1 is computed by the moving time specified interpolation computing means of the storage section A3 based on the moving time of the master robot irrespective of the specified moving speed. As a result, at every step where the synchronization is turned ON, the moving times of the master and slave robots are made equal to each other, thereby making it possible to achieve the synchronous control of the both robots. In other words, the master and slave robots are made to move in the same time indicated by the same clock so that they can be synchronized accurately.

On the other hand, if it is judged at block 7 that the synchronization has been turned ON, that is, the synchronization is continued from the preceding step, the processing proceeds to block 9. At block 9, it is judged based on the informations written in the shared memory C whether or not the synchronization of the other robot is turned ON as well. The judgements made at blocks 7 and 8 as described above are also based on the informations in the shared memory C likewise. When it is judged that the synchronization is turned ON, the processing returns to block 10 at which the aforementioned synchronous control is executed. On the other hand, when it is judged that the synchronization is turned OFF, the processing proceeds to blocks 16 and 18 at which the aforesaid asynchronous control is executed.

Figure 4:
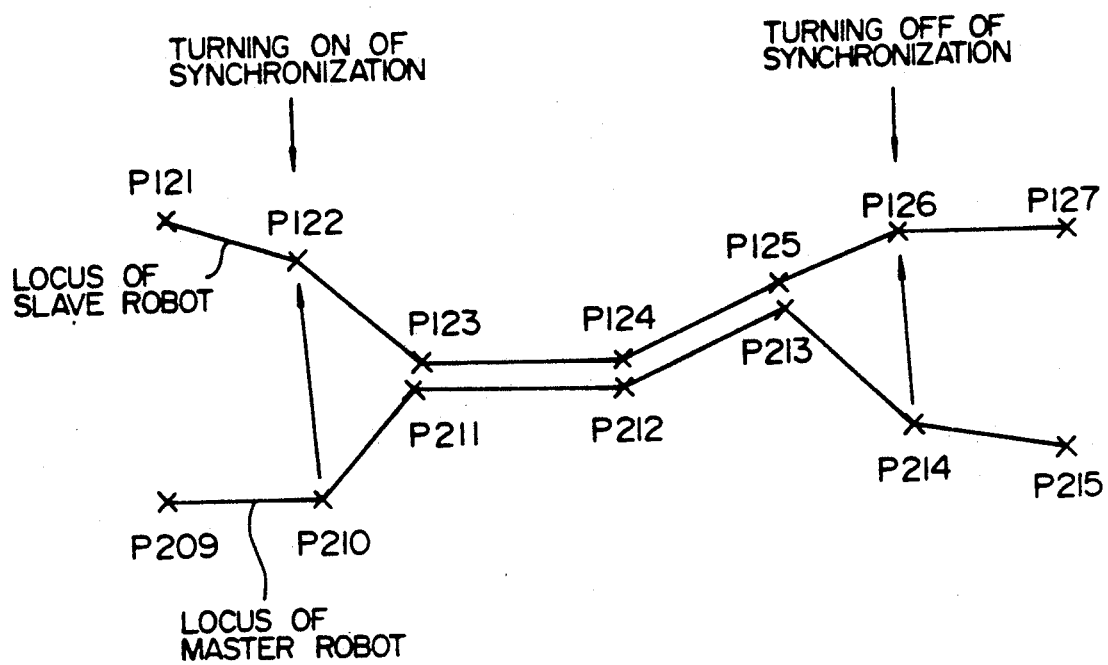
FIG. 4 is a diagram showing the loci of a master robot and a slave robot controlled synchronously by the method of the present invention.

FIG. 4 shows the loci of the movements of the master and slave robots which are subjected to the above-described synchronous control. In the drawing, P121 represents the position of the robot 1 corresponding to the step 21 and P212 represents the position of the robot 2 corresponding to the step 12. The synchronization of the master robot is turned ON at P210 and turned OFF at P214. On the other hand, the synchronization of the slave robot is turned ON at P 122 and turned OFF at P 126. Accordingly, the slave and master robots execute their programs independently of each other before arriving at P122 and P210, respectively, and one of the robots reaching earlier the step corresponding to these positions is rendered standby waiting for the arrival of the other robot. The both robots are then operated synchronously so that they arrive simultaneously at P123 and P211, P124 and P212, P125 and P213, and P126 and P214. Thereafter, the master and slave robots execute their programs independently of each other again at P214-215 and P126-127, respectively.

Figure 5:
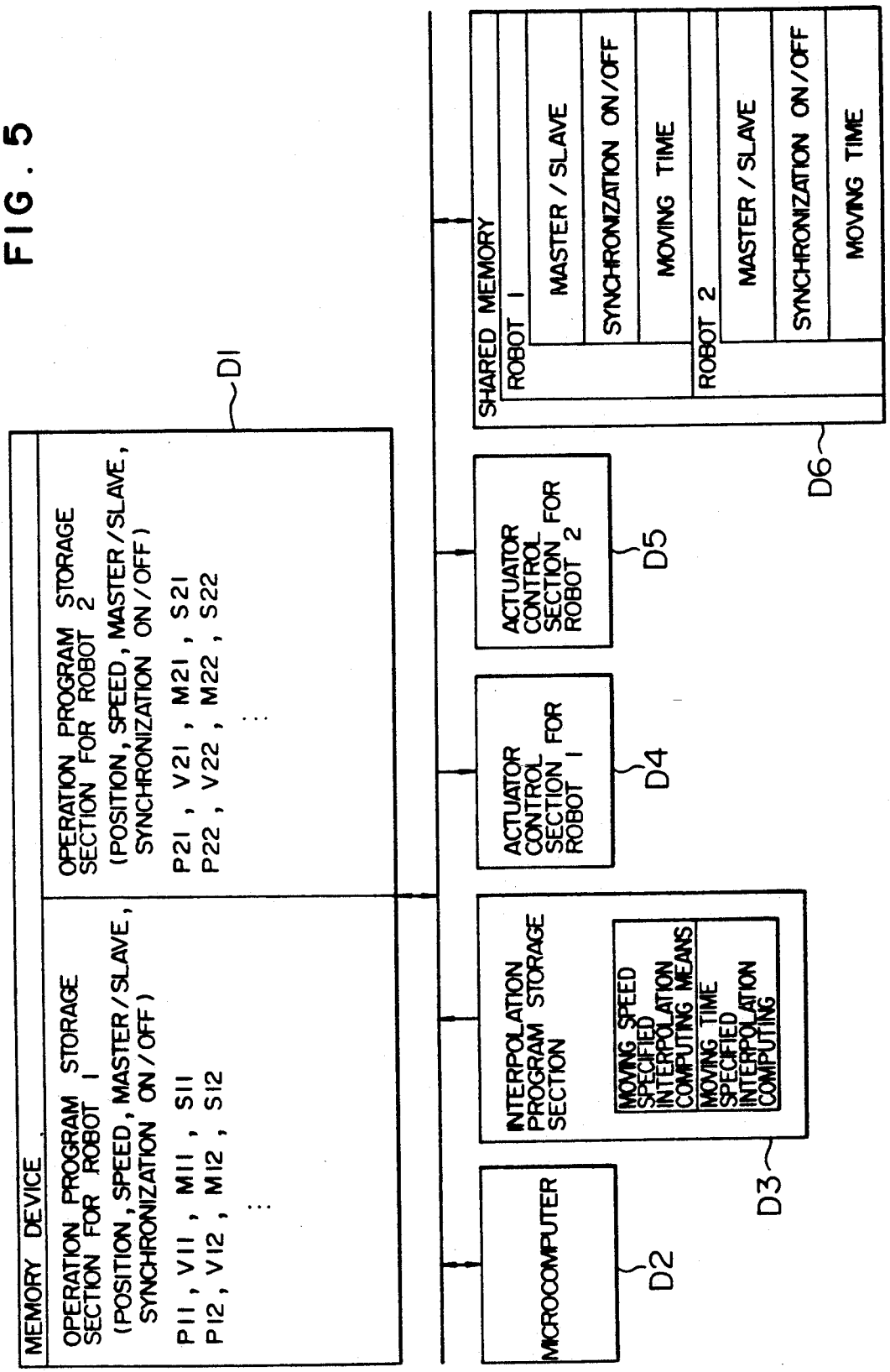
FIG. 5 is a block diagram showing the construction of a control apparatus according to another embodiment of the present invention.

FIG. 5 shows the construction of a control unit according to another embodiment of the present invention. Unlike the control unit 20 of FIG. 2, this control unit comprises a memory device D1, a microcomputer D2 and an interpolation computing program storage section D3 which are all common to the robots 1 and 2. However, the memory device D1 is provided with two operation program storage areas in which the operation programs of the robots 1 and 2 are stored respectively. Further, the interpolation computing program storage section D3 comprises a moving speed specified interpolation computing means and a moving time specified interpolation computing means. An actuator control section D4 for the robot 1, an actuator control section D5 for the robot 2 and a shared memory D6 are the same as those of the first embodiment.

The control unit of this embodiment is intended to control two robots with one microcomputer according to the method of the present invention by employing the time-sharing processing. To this end, in synchronizing the two robots, the interpolation computing is not performed about the robot serving as the slave but executed about the both master and slave robots simultaneously according to the operation program of the master robot. Due to such measure, it is possible to reduce the discrepancy in the synchronous control caused due to indeterminacy of the order of processing by the time-sharing.

Figure 6:
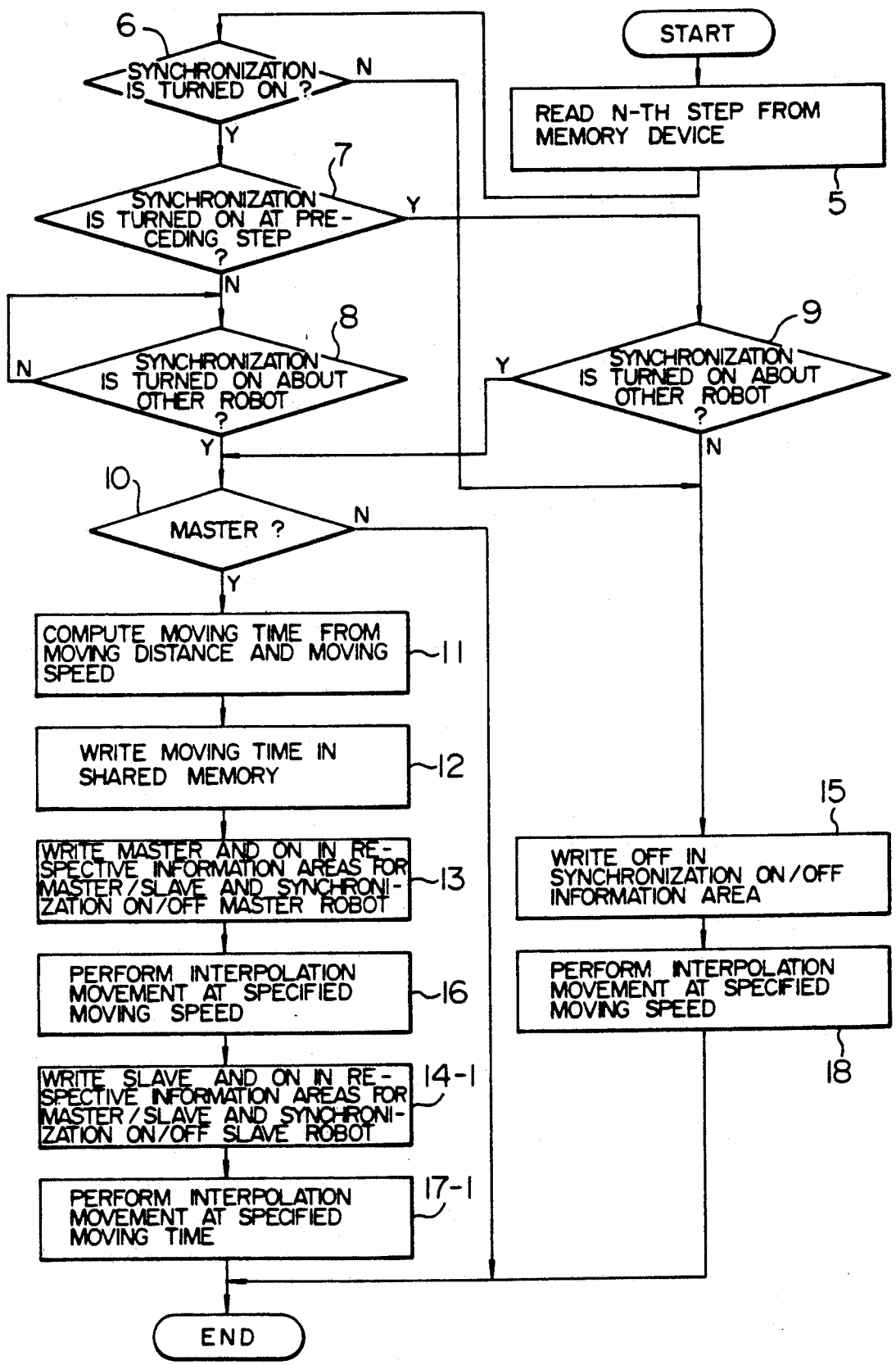
FIG. 6 is a flow chart of the synchronous control effected by the apparatus of FIG. 5.

FIG. 6 is a flow chart of the synchronous control effected by the control unit of the present embodiment. In this control, the processing operations at blocks 14 and 17 executed for the slave robot as shown in FIG. 3 are omitted in view of the above-described object, but the same processing operations are added as blocks 14-1 and 17-1 following block 16 for the master robot. Accordingly, when the synchronization is turned OFF, the interpolation movement of the slave robot is performed at block 18 similarly to the first embodiment, and however, when the synchronization is turned ON, the interpolation movement of the slave robot is performed after the interpolation movement processing operation of the master robot. Other processing operations as well a the processing operation itself for the interpolation movement of the slave robot are the same as those in the case of the first embodiment. In this way, the movements of the two robots can be synchronized according to the method of the present invention when necessary.

It will be understood easily that, if it is intended to increase the robots in number in the embodiment shown in FIG. 2, it becomes possible to effect the quite same control by increasing the control sections designated by B1-4 and the areas in the shared memory C correspondingly to the number of the added robots. In this case as well, the robot to be recognized as the master must be only one at all times and the other remaining robots all serve as the slave.

As has been described above, according to the present invention, the interpolation computing program storage section of the industrial robot control apparatus comprises the moving speed specified interpolation computing means and the moving time specified interpolation computing means. Further, the operation program of each robot contains the master/slave changing information and the synchronization ON/OFF changing information. In case of controlling a plurality of robots to make them work in cooperation with each other, the interpolation computing means are changed over in accordance with these informations. Namely, when the synchronization is turned OFF, more than two robots are made to operate independently or each other. On the other hand, when the synchronization is turned ON, the robot serving as the master performs the ordinary moving speed specified interpolation movement, while the remaining robots serving as the slave perform the interpolation movement based on the moving time required for the master robot without using the specified moving speed in the interpolation computing so as to be synchronized with the master robot. As a result, it is possible to actualize the synchronous control of more than two robots while making them perform the interpolation movement.

Under the synchronous control according to the present invention, two or more robots can be operated not only to work synchronously at certain working positions by making use of the interpolation computing but also to move independently of each other while performing the linear or circular interpolation movement. In consequence, it is possible to easily actualize the system in which two or more robots cooperate with each other to carry out the trimming and the welding. Further, since the plurality of robots are moved in the same moving time with use of the same clock, it is possible to actualize the accurate synchronous control.

What is claimed is:

1. A method of controlling at least two industrial robots with use of a control apparatus which comprises at least one microcomputer used to execute operation programs of respective robots, at least one operation program storage section in which said operation programs are stored, at least one interpolation computing program storage section in which an interpolation computing program used to move each robot from one working position to the next working position is stored, actuator control sections the number of which corresponds to the number of said robots, and one shared memory, wherein said interpolation computing program storage section is provided with means for computing an interpolation movement with a specified moving speed and means for computing the interpolation movement with a specified moving time, said operation programs each contain a master/slave changing information used to designate one of the robots as the master and the remainder as the slave, and a synchronization ON/OFF changing information used to judge whether or not it is necessary to synchronize the robots, the method comprising the steps of changing said two interpolation computer means in accordance with said two changing informations, operating said robots independently of each other when the synchronization is turned OFF about all the robots, performing with the master robot the moving speed specified interpolation movement when the synchronization is turned ON about all the robots, and performing with the slave robot the moving time specified interpolation movement due to which the slave robot is moved in the same time required for the movement of the master robot without making use of the specified moving speed, thereby controlling at least two robots synchronously while performing the interpolation movements.

2. A method according to claim 1, wherein said control apparatus has only one microcomputer, said operation programs each contain a master control program and a slave control program, further comprising the steps of executing said master control program and said slave control program by said one microcomputer through a time-sharing processing, and executing interpolation computing processings of the master and slave robots in accordance with said master control program when the synchronization is turned ON while omitting the interpolation computing processing of said slave control program, thereby reducing the discrepancy in synchronization in case of controlling two robots by one microcomputer.

3. A control method of synchronizing the operations of at least two industrial robots which can operate independently of each other in accordance with their respective operation programs, said method comprising the steps of:
obtaining the time required for one of said robots to move from one working position to the next position at which it operates jointly with the remaining robot; and
synchronizing the operations of all the robots by moving the remaining robot from the position where it exists at present to another position corresponding to said next position in the same time as said required time.

4. A method according to claim 3, wherein the operation program of each robot contains an information used to instruct the synchronization so that the synchronization of said robots is executed in accordance with these informations.

5. A method according to claim 3, further comprising the steps of:
designating one of the robots as the master and the remaining robot as the slave when performing the synchronous control; and
computing said required time about the robot designated as the master 6. A control apparatus used to synchronize the operations of at least two industrial robots which can operate independently of each other in accordance with their respective operation programs, said apparatus comprising;
means for obtaining the time required for one of said robots to move from one working position to the next position at which it operates jointly with the remaining robot; and
means for synchronizing the operations of all the robots by moving the remaining robot from the position where it exists at present to another position corresponding to said next position in the same time as said required time.

7. An apparatus according to claim 6, wherein the operation program of each robot contains an information used to instruct the synchronization so that the synchronization of said robots is executed in accordance with these informations.

8. An apparatus according to claim 7, wherein the operation program of said each robot further contains an information used to designate one of the robots as the master and the remaining robot as the slave in performing the synchronous control, and said required time is computed about the robot designated as the master.

9. An apparatus according to claim 6, further comprising a storage section in which a program used to compute the interpolation movement due to which each robot is moved from a first working position to a second position is stored, said storage section is provided with means for computing the interpolation movement with a specified moving speed and means for computing the interpolation movement with a specified moving time, and said means for synchronizing the operations includes said moving time specified interpolation movement computing means.

10. An apparatus according to claim 8, further comprising one microcomputer means for executing the operation program of each robot, wherein said operation program contains a master control program and a slave control program, said master control program and said slave control program are executed by said one microcomputer means through the time-sharing processing, and the interpolation computing processings of the master and slave robots are executed in accordance with said master control program when the synchronous control is effected while omitting the interpolation computing processing of said slave control program, thereby reducing the discrepancy in synchronization in case of controlling two robots by one microcomputer means.

* * * * *